(12) United States Patent
Dhanakshirur et al.

(10) Patent No.: US 8,712,451 B2
(45) Date of Patent: Apr. 29, 2014

(54) PHONE MESSAGING USING AUDIO STREAMS

(75) Inventors: Girish Dhanakshirur, Delray Beach, FL (US); Leslie Robert Wilson, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1475 days.

(21) Appl. No.: 11/927,017

(22) Filed: Oct. 29, 2007

(65) Prior Publication Data

US 2009/0111432 A1     Apr. 30, 2009

(51) Int. Cl.
*H04M 3/42*     (2006.01)
*H04M 1/64*     (2006.01)
*H04L 12/58*    (2006.01)

(52) U.S. Cl.
CPC H04M 1/64 (2013.01); H04M 3/42 (2013.01); H04L 12/5845 (2013.01)
USPC ............... 455/466; 455/414.1; 379/88.04

(58) Field of Classification Search
CPC .... H04L 12/581; H04L 12/5845; H04I 65/00; H04M 1/64; H04M 3/42

USPC ............. 455/466, 412, 1, 413, 414.1; 379/88.04–88.18

See application file for complete search history.

(56) References Cited

U.S. PATENT DOCUMENTS

| 6,993,290 | B1 * | 1/2006 | Gebis et al. ............... 455/45 |
| 7,197,277 | B2 * | 3/2007 | Davies et al. ............. 455/41.2 |
| 7,215,965 | B2 * | 5/2007 | Fournier et al. ........... 455/456.1 |
| 7,715,351 | B2 * | 5/2010 | Karaoguz et al. .......... 370/338 |
| 7,730,143 | B1 * | 6/2010 | Appelman ................. 709/206 |
| 2003/0083080 | A1 * | 5/2003 | Fournier et al. ........... 455/466 |
| 2004/0102201 | A1 * | 5/2004 | Levin ....................... 455/466 |
| 2004/0203898 | A1 * | 10/2004 | Bodin et al. .............. 455/456.1 |
| 2005/0152515 | A1 * | 7/2005 | Amir et al. ............... 379/88.13 |

* cited by examiner

Primary Examiner — Nizar Sivji
(74) Attorney, Agent, or Firm — Novak Druce Connolly Bove + Quigg LLP

(57) ABSTRACT

A method of phone messaging includes encoding a data packet into an audio stream, said data packet comprising a message addressed to a mobile device operating in a wireless network, placing a call to said mobile device using a voice channel of said wireless network, transmitting said audio stream over said voice channel to said mobile device, and reconstructing said data packet from said audio stream.

14 Claims, 3 Drawing Sheets

PHONE MESSAGING USING AUDIO STREAMS

FIELD OF THE INVENTION

This invention is related to the field of phone messaging, and more particularly, to systems and methods for phone messaging using audio streams.

BACKGROUND OF THE INVENTION

In general, wireless mobile devices can be used for exchanging data. For example, these devices can be used for browsing the Internet, checking emails, or exchanging messages with other wireless devices. In order to maintain competitiveness, many wireless carriers continually upgrade their networks to support new data exchange capabilities, including new types of messaging formats and delivery methods. However, because capabilities vary greatly between different carriers, problems generally arise as a mobile phone user roams between service areas managed by different carriers. For example, even though a mobile device in the user's home area can support a plurality of messaging formats, the wireless network in another location may be able to only support only a few or none of these messaging formats.

Additionally, most carriers charge additional fees for using messaging services. For example, users can subscribe to a messaging service that includes unlimited messaging or a fixed number of messages. However, many users are generally uninterested in using messaging on a regular basis or may be unwilling to pay additional fees. Therefore, when one of these users receives a message or needs to utilize such services on a one-time or otherwise irregular basis, users can be frustrated by the per-message fees incurred, such fees typically being relatively higher than those paid by messaging subscribers.

Therefore, there is a need for providing phone messaging services without using the messaging features of a wireless network.

SUMMARY OF THE INVENTION

In a first embodiment of the present invention, a method of phone messaging can include encoding a data packet into an audio stream, the data packet comprising a message addressed to a mobile device operating in a wireless network, placing a call to the mobile device using a voice channel of the wireless network, transmitting the audio stream over the voice channel to the mobile device, and reconstructing the data packet from the audio stream.

In a second embodiment of the present invention, a system for phone messaging can include a message processing system for encoding a data packet into an audio stream and for transmitting the audio stream over a voice call on a wireless network, where the data packet comprises a message addressed to a mobile device, a call control gateway for connecting the message processing system to the mobile device using a voice channel of the wireless network, and a speech recognition engine for reconstructing the data packet from the audio stream.

In a third embodiment of the present invention, a computer-readable storage medium can include a computer program having a plurality of code sections executable by a computer for causing the computer to perform the steps of: encoding a data packet into an audio stream, where the data packet comprises a message addressed to a mobile device operating in a wireless network, placing a call to the mobile device using a voice channel of the wireless network, transmitting the audio stream over the voice channel to the mobile device, and reconstructing the data packet from the audio stream.

DETAILED DESCRIPTION OF THE DRAWINGS

Figure 1:
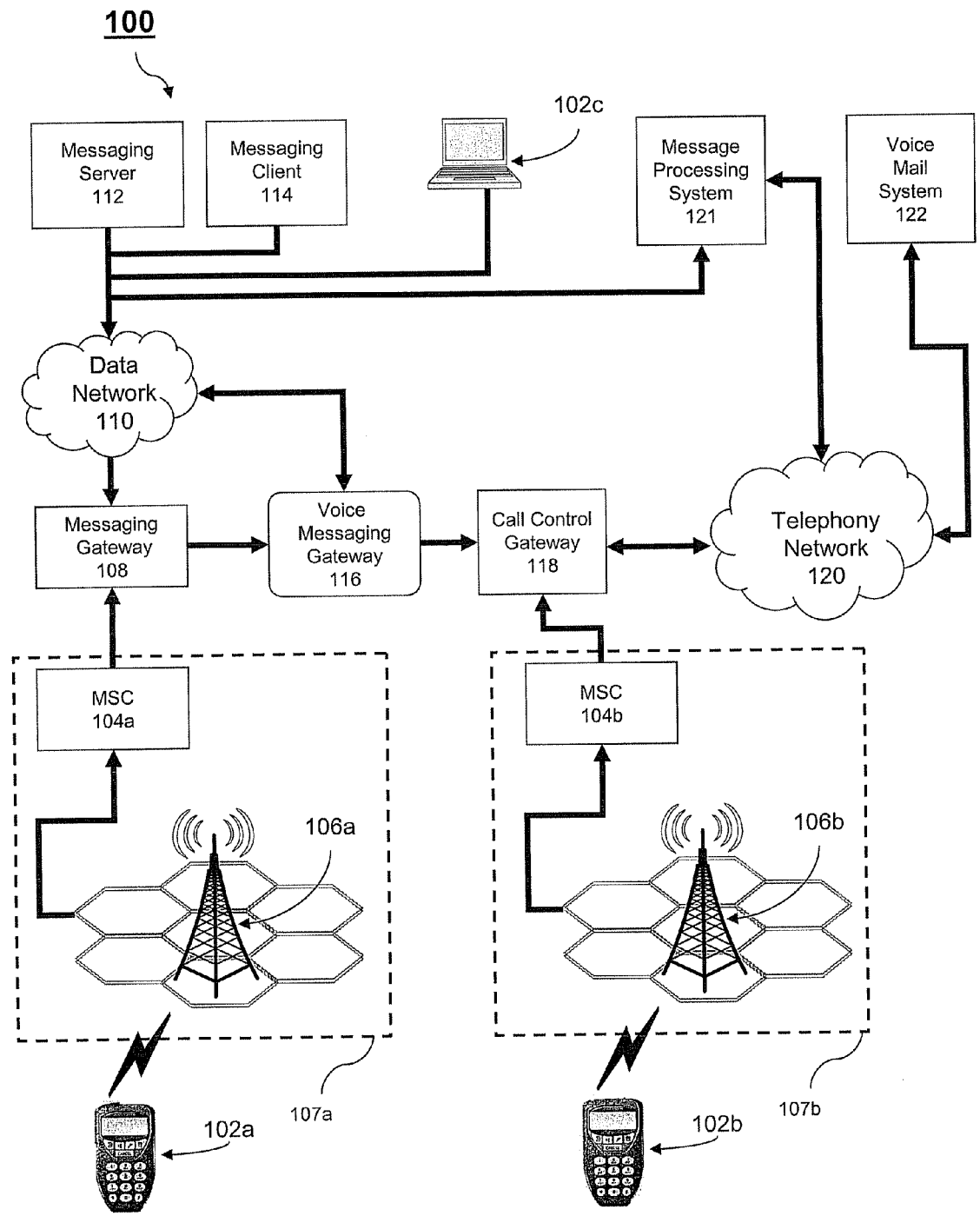
FIG. 1 is a schematic view of an exemplary communications system supporting phone messaging using audio streams according to an embodiment of the present invention.

In a typical phone messaging network, mobile devices generally transmit and receive data and voice traffic while operation in wireless networks having mobile switching centers (MSC) associated with the base stations currently serving the devices 102a, 102b. Accordingly, when a first mobile device wishes to send a message to a second mobile device, the first mobile device constructs a data packet that includes the message and routing information for the packet. The data packet can then be transmitted from the first mobile device to a serving base station over a data channel of the wireless network. The base station, in turn, can forward the packet to an associated MSC. The MSC can then analyze the packet, determine that it corresponds to a message, and forward the message to the appropriate messaging gateway.

Alternatively, messaging gateways can receive data packets including messages from other sources. For example, a messaging gateway can be communicatively coupled to a data network and one or more messaging servers or messaging clients 114 can also be communicatively coupled to the data network. Accordingly, these servers and clients can also be utilized to send messages to mobile devices operating in wireless networks.

Once a messaging gateway receives the data packet, it can determine the identity of the recipient mobile device and determine which MSC is associated with the base station currently serving the recipient mobile device. The MSC can then forward the packet to the serving base station, which can transmit the data packet to the recipient mobile device over a data channel of a wireless network. The user of the recipient mobile device can then view the message. In general, if a mobile device is currently unavailable (e.g., the mobile device is off, or outside a coverage area), the messaging gateway can store the packet until the mobile device becomes available. Once available, the mobile device can then receive the message.

Unfortunately, several problems can arise with these types of messaging systems. For example, if a MSC and a base station currently serving a mobile device cannot support the format of the message or the packet, delivery of the message may be delayed, or even worse, corrupted or lost. Even if the MSC and base station currently serving a mobile device support the format of the message in the incoming packet, limitations on certain messaging formats may exist, such as message length or size. This can result in incomplete or truncated messages being delivered to a mobile device.

One aspect of the present invention is that it provides a method and system for sidestepping these limitations of remote networks by using a voice channel of wireless networks to transmit phone messages. In particular, embodiments of the present invention provide for forwarding messages as an audio stream over a voice channel of a wireless network rather than as a data packet transmitted over a data channel of a wireless network. Therefore, embodiments of the present invention allow message recipients to receive messages in any wireless network, regardless of the wireless network's capabilities and/or without having to rely on conventional message delivery systems.

FIG. 1 depicts an exemplary embodiment of a plurality of mobile devices 102a, 102b, 102c operating in portions of a communication system 100 that supports messaging services using audio streams according to an embodiment of the present invention. The mobile devices 102a, 102b, 102c in the present illustration can represent multimode mobile devices, including, but not limited to, cell phones, laptop computers, personal digital assistants (PDAs), or any combination thereof, which are capable of supporting wireline and/or wireless communication technologies. In the case of wireline communications, the mobile devices 102a, 102b, 102c can utilize xDSL, cable, or PSTN telephony interfaces for communicating with data networks 110 or telephony networks 120, which can include hybrid technologies that support circuit-switched packet-switched communications. The mobile devices 102a, 102b, 102c can also support accessory interfaces such as USB, Firewire, and other connectivity technologies.

Alternatively, or in combination, the mobile devices 102a, 102b, 102c can support any number of wireless communication protocols for operating in a plurality of wireless networks 107a, 107b. For example, the mobile devices 102a, 102b, 102c can utilize wireless access technologies such as the family of 802 protocols defined by the Institute of Electrical and Electronics Engineers (IEEE). In another example, the mobile devices 102a, 102b, 102c can utilize long-range wireless access technologies such as, for example, cellular, software defined radio (SDR) and/or WiMAX to communicate with base stations 106a, 106b and associated MSC's 104a, 104b. Cellular access technologies can include, for example, AMPS, CDMA-IX, UMTS/HSDPA, GSM/GPRS, TDMA/EDGE, EV/DO, and next generation technologies as they arise. Additionally, the mobile devices 102a, 102b, 102c can support short-range wireless technologies such as WiFi, Bluetooth, Zigbee, cordless communications such as digital enhanced cordless telecommunications (DECT), or next generation technologies as they arise.

Furthermore, the mobile devices 102a, 102b, 102c can be communicatively coupled to one or more computing systems operating in one or more data networks 110. computing systems can correspond to one or more servers operating as centralized or distributed computing systems. By way of example, and not by way of limitation, these computing systems can include web servers, email servers, instant messaging servers, and phone messaging servers. Additionally, one or more messaging clients 114 can be used to compose and send messages directly to the mobile device 102a, 102b, 102c, or indirectly through a messaging server 112. Messaging servers 112 can be configured to support phone messaging using Short Messaging Services (SMS), Enhanced Messaging Services (EMS), and Multimedia Messaging Services (MMS). However, the invention is not limited in this regard and is equally applicable to any other type of messaging services and next generation messaging services as they arise.

As shown in FIG. 1, communications system 100 can include a voice messaging gateway 116 to communicatively couple a conventional messaging gateway 108 to a call control gateway 118. The call control gateway 118 can be communicatively coupled to one or more wireline or wireless telephony networks 120 to provide dialing, switching, and control of voice calls. For example, the call control gateway 118 can be communicatively coupled to a wireless network 107b currently serving mobile device 102b and can connect and route voice calls for the mobile device 102b. Accordingly, the call control gateway 118 can connect, using a voice call, the mobile device 102b and any other communications devices accessible via a telephony network 120, including a voice mail system 122 associated with one or more mobile devices 102a, 102b, 102c. The voice messaging gateway 116 can also be communicatively coupled to a message processing system 121 via data network 110 to exchange data packets with voice messaging gateway 116. The message processing system 121 can also be communicatively coupled to the call control gateway 118 via telephony network 120 for placing and receiving voice calls. The operation of the message processing center will be described in greater detail below.

In the illustrated embodiment, FIG. 1 depicts the messaging gateway 108, the voice messaging gateway 116, and the message processing system 121 as separate components. However, it is also within the scope of the present invention to combine the functions of one or more of these components into a single system or to provide a distributed system for performing these functions. Furthermore, although various embodiments are discussed below with reference to a messaging system, the system and methods discussed herein are equally applicable to the exchange of any type of data.

Figure 2:
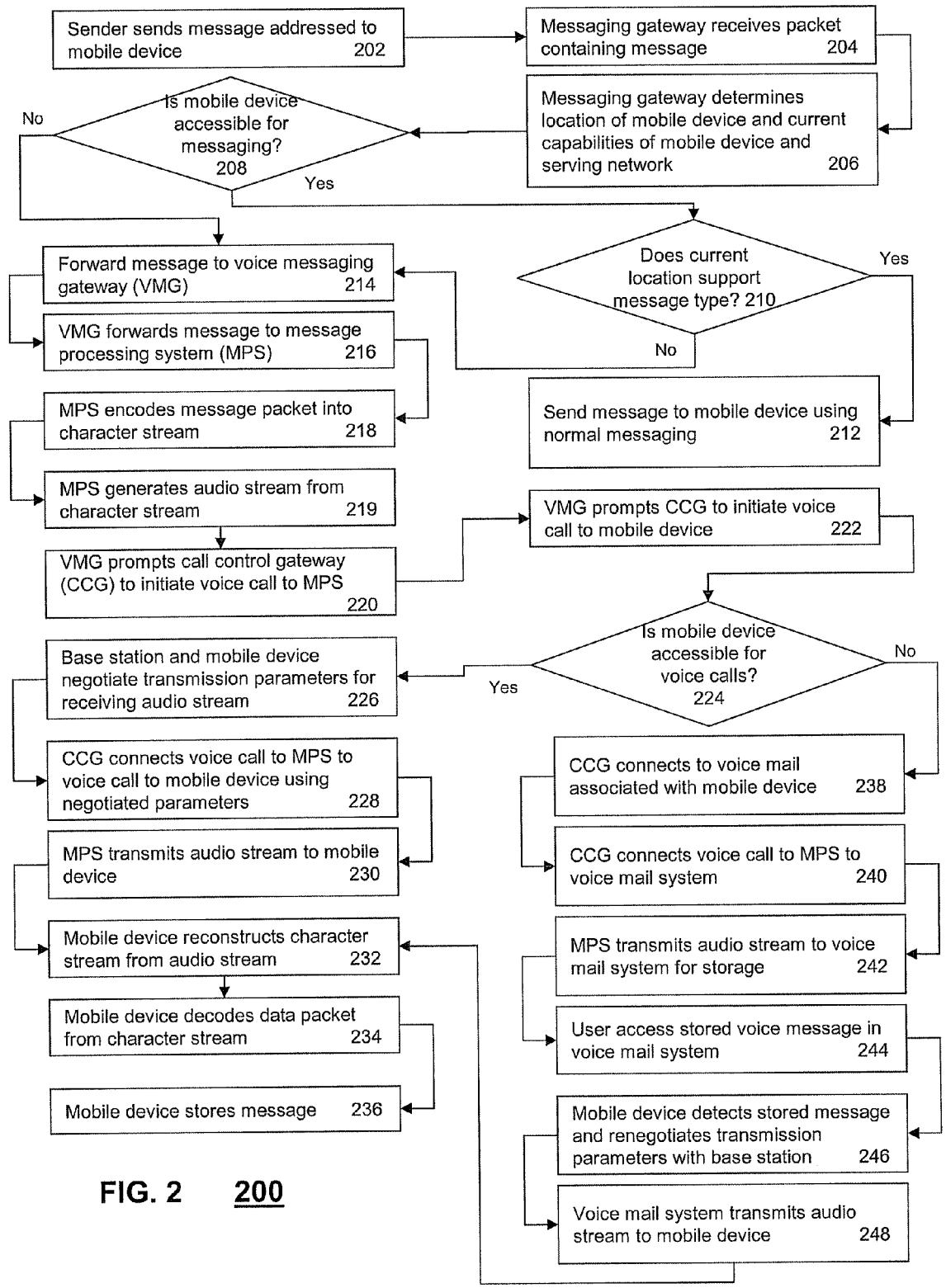
FIG. 2 is a flowchart of exemplary steps of a method for phone messaging using audio streams according to an embodiment of the present invention.

FIG. 2 is a flowchart illustrating steps in an exemplary method 200 for phone messaging using audio streams according to another embodiment of the present invention. In step 202, a sender can compose a message, select a recipient address, and send the message over the wireless network 107a. As previously discussed, such messages can be composed in several ways. For example, in the case of SMS/EMS/MMS messaging, the sender can compose the message using a mobile device, such as a cell phone. In another example, the sender can use a messaging client 114 through the data network. In yet another example, the message can originate from a messaging server operating in data network 114. Such a messaging server can include an email or instant messaging server. However, the messaging server can also be part of an enterprise application to "push" messages to the messaging gateway 108. For example, the enterprise application messages received by email to a mobile device associated with the recipient.

Regardless of the origin of the message sent in step 202, the message can be received as a data packet by the messaging gateway 108 in step 204. Upon receipt of the message packet in step 204, in step 206 the messaging gateway 108 can analyze the packet to determine the intended recipient (i.e., the recipient's mobile device 102b), the message type, and the current location of the intended recipient (i.e., identify the wireless network 107b currently serving the mobile device 102b). Additionally, the messaging gateway can also analyze the wireless network 107b to determine if the message format of the message packet received in step 204 is supported in the wireless network 107b.

In step 208, the messaging gateway 108 can first determine whether the mobile device 102b is accessible for messaging purposes. That is, the messaging gateway 108 can determine whether messaging services are supported in the wireless network 107b. However, the invention is not limited in this regard and other conditions can be used to determine whether a mobile device is accessible for messaging. For example, the messaging gateway 108 can be configured to determine whether the mobile device 102b is associated with a plan or subscription for messaging services. In another example, features on a mobile device 102b for receiving messaging can be disabled. In yet another example, the wireless carrier for the mobile device 102b may not provide messaging features. In general, service information for the mobile device 102b can be determined by accessing an MSC in the home network of the mobile device. In any event, if the messaging gateway 108 determines that the mobile device 102b cannot receive messages, regardless of the reason, the mobile device is considered to be inaccessible for messaging.

Separately or in combination with step 208, the messaging gateway 108 can also determine in step 210 whether the message type or format in the data packet is supported by wireless network 107b. For example, a data packet can include an MMS message, however, the wireless network 107b may only support SMS messages. Accordingly, attempting to transmit an incompatible type of message can lead to message delivery failures or loss of message content by truncation or corruption. However, if the wireless network 107b does support the type of messaging indicated in the message in the data packet and the mobile device 102b is currently accessible for messaging, the message can then be delivered in step 212 using conventional message delivery.

However, in cases where the mobile device 102b is not accessible for messaging (step 208) or the wireless network 107b currently serving the mobile device 102b does not support the format of the message in the data packet (step 210), the present invention can provide for transmitting messages to the mobile device 102b by using an audio stream during a voice call. As previously noted, using an audio stream permits message delivery while sidestepping any technical issues regarding whether a data packet can be successfully delivered to the mobile device using a data channel. Furthermore, using an audio stream permits message delivery for infrequent users by deducting minutes from their voice plans, rather than charging extra fees for delivery of messages using messaging services.

Accordingly, rather than making any further attempts to forward the data packet to the mobile device 102b, in step 224 the data packet can instead be forwarded to a voice messaging gateway 116. Like the messaging gateway 108, the voice messaging gateway 116 can be configured to determine the wireless network 107b currently supporting the mobile device 102b. However, the voice messaging gateway 116 can also be configured to prompt other components of communications system 100 to perform tasks that enable the delivery of the data packet using an audio stream.

First, in step 216, the voice messaging gateway 116 can transmit the data packet to the message processing system 121. Upon receipt of the data packet, the message processing system 121, in step 218, can encode the message for delivery as an audio stream. The encoding can start by first converting the data packet into a stream of characters. The stream of characters used can correspond to any type of character set, including, but not limited to ASCII or Unicode variants. In some embodiments, the entire character set can be used to encode the data in the packet. In other embodiments, the used character set can comprise a subset of a larger character. For example, actual text in a message can be encoded only using printable characters. In another example, the character stream can be only a series of numbers, including, but not limited to decimal, binary, and hexadecimal numbers.

Once the data packet is encoded into a character stream in step 218, the audio stream can be generated in step 219. In the embodiments of the invention, the audio stream can be generated in several ways. In particular, a different sound can be associated with each character of the character code being used. For example, for letters a-z, 26 different sounds can be provided. Accordingly, as the number of characters in the character code increases, the number of different sounds that needs to be provided also increases.

In some embodiments of the present invention, the sounds can be provided by using a text-to-speech engine in the messaging processing system 121 to produce an utterance for each character. Accordingly, the resulting audio stream is a sequence of utterances. In other embodiments, the sounds can instead be provided by using a multi-frequency signal generator to produce a different tone for each character in the character set. By way of example and not by way of limitation, if the character set is limited to decimal numbers, standard DTMF tones could be used to generate the audio stream. In yet other embodiments, a combination of methods could be used. However, speech based sounds and multi-frequency tones are presented as exemplary methods only. One of skill in the art would recognize that any other system for producing and mapping sounds to characters in a character set would also be within the scope of the present invention.

Subsequently, or in combination with steps 214-219, the voice messaging gateway 116 can also prompt the call control gateway 118 to establish separate voice calls to the message processing system 121 in step 220 and to the mobile device 102b in step 222. In some embodiments, the voice call connection to the mobile device 102b can require that the user manually connect to the incoming call. However, in other embodiments, the mobile device 102b can include an embedded application that detects incoming calls prompted by the voice messaging gateway 116. In such embodiments, the embedded application can be configured to detect calls associated with a particular telephone number or other Caller ID information. For example, call control gateway 118 can make a call to the mobile device 102b and provide caller ID information that says "Voice Messaging Services" and the embedded application can recognize the information and automatically connect the call. In other embodiments, additional signals can be to the mobile device 102b to indicate an incoming message over a voice channel. For example, the handshake signals between the mobile device 102b and the serving base station 106b can be configured to include extra signals that can prompt the embedded application to automatically connect the mobile device 102b to the incoming call. In some embodiments, the detected signals can cause the embedded application to automatically signal a user to take action. For example, the embedded application can be configured to generate a prompt for the user as to whether he wishes the message to be received now or whether it should be sent at a later time.

If the mobile device 102b is to be connected to the incoming voice call in step 224, in step 226 the mobile device 102b can establish a voice call connection with a base station 106b of the wireless network 107b and negotiate transmission parameters for receiving and decoding the audio stream in the mobile device 102b. The transmission parameters can be used not only to define the rate at which information is to be received, but also the particular audio bandwidth that will be available for transmission of the audio stream. In the various embodiments, the selection of the audio bandwidth can vary according to the type of sounds used to create the audio stream. For example, an audio stream comprising standard DTMF tones can use a conventional bandwidth for telephone conversations. In contrast, if an audio stream comprises a stream of utterances to be identified using a speech recognition engine, one of ordinary skill in the art would recognize that a different bandwidth would be needed. For instance, communications over a digital voice channel can require using a codec optimized for speech recognition purposes rather than the typical codec required for standard voice calls.

In the various embodiments, the selection of playback speed for the audio stream can also vary according to the type of sounds used to create the audio stream. For example, it is known to those of skill in the art that standard DTMF tones can be easily detected varying rates of speed, even at high rates of speed. In contrast, if an audio stream comprises a stream of utterances to be identified using a speech recognition engine, the rate at which the utterances are received may need to vary according to the capabilities of speech recognition engine available to the mobile device 102b.

Once the transmission parameters have been negotiated in step 226, the call control gateway 118 can connect the calls to the message processing system 121 and the mobile device 102b in step 228. Once connected to the mobile device 102b, the message processing system 121, in step 230, can transmit the audio stream to the mobile device 102b. The mobile device 102b, in step 232, can then reconstruct the character stream used to generate audio stream. In some embodiments, the mobile device 102b can begin reconstruction during the transmission. In other embodiments, the mobile device 102b can store the audio stream in a memory element and being reconstruction only after the audio stream is terminated. After the character stream is reconstructed in step 232, the data packet, i.e., the message content, can be decoded in step 234. Methods and systems for decoding binary data from character streams and well-known in the art and will not be discussed here. Once the character stream is decoded into the data packet in step 234, the message can be stored in mobile device 102b in step 236. Afterwards, the user can view the message.

As previously discussed, audio streams can be generated in several ways. Accordingly, the reconstruction of the character stream from the received audio stream can also vary. For example, if the audio stream comprises a series of multi-frequency tones, such as DTMF tones, the mobile device can detect the tones and re-create the character stream from the tones. In another example, where the audio stream comprises a stream of utterances, the mobile device 102b can use a speech recognition engine to recognize each character and to recreate the character stream. In the various embodiments, mobile devices 102b can use local or remote speech recognition engines. Local speech recognition engines can be, for example, an embedded application on the mobile device. A remote speech recognition engine can be one available via another network connection. For example, a mobile device 102b may not have access to any data channels of the serving wireless network 107b. However, the mobile device 102b may instead have access to a data network via a wireline connection or a local wireless connection. Accordingly, the mobile device 102b can be configured to use this alternate connection to access one or more remote speech recognition engines. In some embodiments, a combination of engines can be used. For example, because a mobile device 102b may have limited computing resources, the mobile device 102b can be configured to first seek a remote speech recognition engine prior to relying on the local engine for speech recognition. Other configurations for distributing speech recognition tasks between local and remote speech recognition engines are well-known in the art and will not be discussed here.

In some embodiments, when a call is placed to the mobile device 102b by the call control gate 118, the mobile device may not be accessible for voice calls. For example, the mobile device may be currently in use. In another example, the mobile device may have a privacy setting for blocking all voice calls during specific periods of time. In some embodiments, the call control gateway 118 can cancel the call and notify the voice messaging gateway 116. The voice messaging gateway can then be configured to attempt to forward the message at another time. However, in most cases, a mobile device 102b is also associated with a voice mail system 122. In such cases, rather than reattempting to contact the mobile device 102b at a later time, the audio stream can be stored as a voice mail message.

Referring back to FIG. 2, if the mobile device 102b is not accessible for voice calls in step 224, the call control gateway 118 can then connect to the voice mail system 122 for the mobile device in step 238. Afterwards, the call control gateway 118 can connect the calls to the message processing system 121 and the voice mail system 122 in step 240. Once connected to the voice mail system 122, the message processing system 121, in step 242, can transmit the audio stream to the voice mail system 122. At step 244, a user can later access the voice mail system 122 and select the stored audio stream for playback. In some embodiments, prior to playback of the audio stream, the mobile device 102b, can renegotiate the transmission parameters with the serving base station 106b in step 246. As previously discussed, transmission parameters can be selected according to the type of audio stream. In these embodiments, negotiation of transmission parameters can occur manually or automatically as previously discussed. However, signals to prompt negotiation can be transmitted from the voice mail system 122 as well.

After the transmission parameters are negotiated in step 246, the voice mail system can transmit the audio stream to the mobile device 102b in step 248. Afterwards, steps 232-236 can be performed, as previously discussed, to reconstruct the character stream, decode the data packet, and store the message in the data packet.

Upon reviewing the aforementioned embodiments, it would be evident to an artisan with ordinary skill in the art that said embodiments can be modified, reduced, or enhanced without departing from the scope and spirit of the claims described below. For example, the exemplary embodiment illustrates the message processing system 121 receiving the data packet and preparing the audio stream prior to establishing a voice call to the mobile device 102b. However, the invention is not limited in this regard and the voice call to the mobile device 102b can be executed first. In such embodiments, the character stream and the audio stream can instead be generated after negotiation of the transmission parameters. Such an embodiment advantageously allows the audio stream to be prepared in a format that is more compatible with the negotiated transmission parameters. For example, a mobile device may support reconstruction of character streams using either multi-frequency tones or utterances. Therefore, if the transmission parameters are more favorable for the transmission and recognition of tones instead of utterances, the message processing system can generate an audio stream using tones than for utterances. Additionally, such a configuration can be used to limit the amount of computing resources needed. In particular, by delaying action on the part of the message processing system 121 until a voice call can be properly established to the mobile device 102b, processing of the data packet is delayed until it is apparent that the audio stream to be generated can be successfully delivered.

Figure 3:
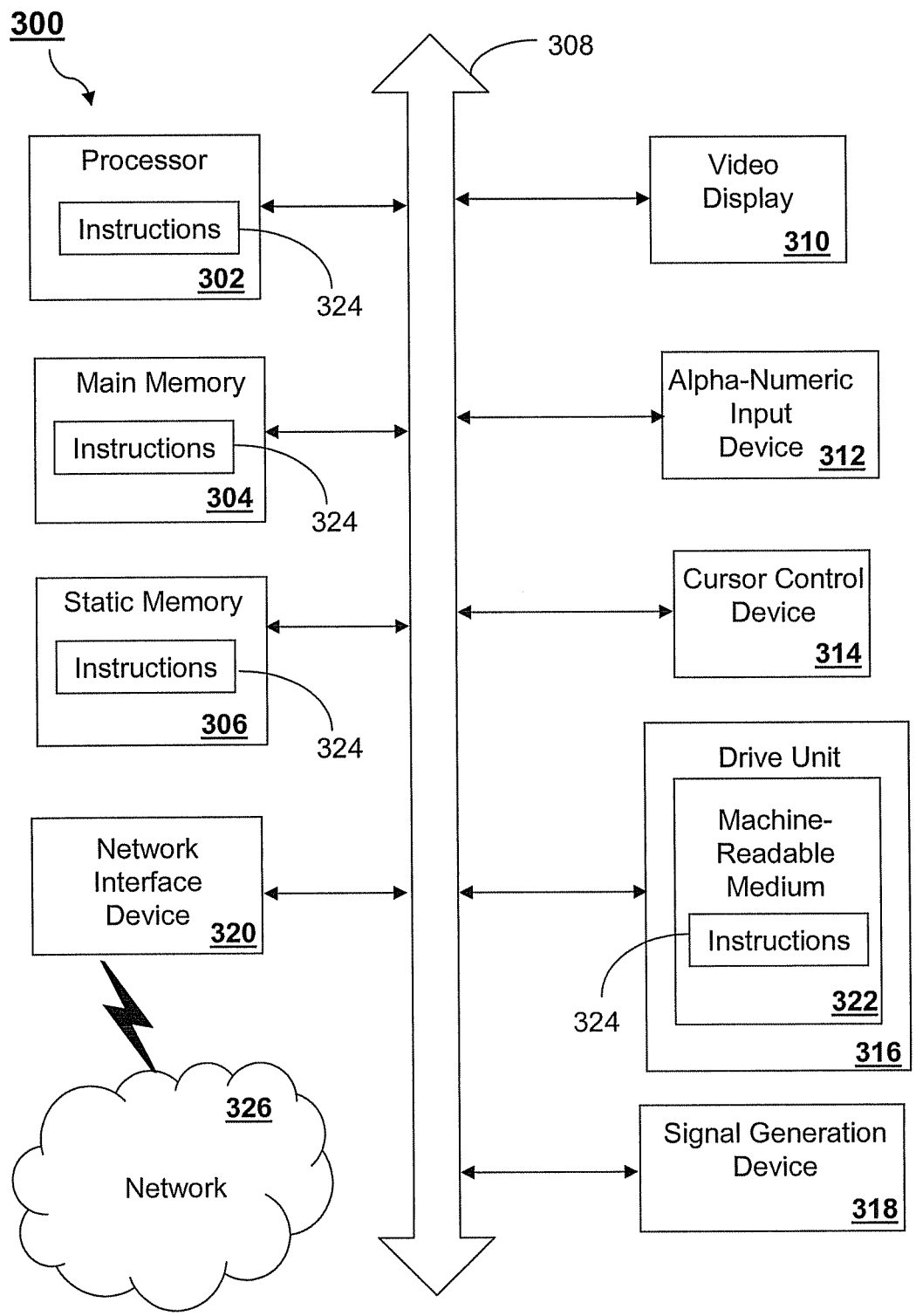
FIG. 3 is a schematic view of a computer system within which a set of instructions operate according to an embodiment of the invention.

FIG. 3 is a schematic diagram of a computer system 300 for executing a set of instructions that, when executed, can cause the computer system to perform one or more of the methodologies and procedures described above. In some embodiments, the computer system 300 operates as a standalone device. In other embodiments, the computer system 300 can be connected (e.g., using a network) to other computing devices. In a networked deployment, the computer system 300 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 300 can include a processor 302 (such as a central processing unit (CPU), a graphics processing unit (GPU, or both), a main memory 304 and a static memory 306, which communicate with each other via a bus 308. The computer system 300 can further include a display unit 310 such as a video display (e.g., a liquid crystal display or LCD), a flat panel, a solid state display, or a cathode ray tube (CRT)). The computer system 300 can include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 can include a computer-readable storage medium 322 on which is stored one or more sets of instructions 324 (e.g., software code) configured to implement one or more of the methodologies, procedures, or functions described herein, including those methods illustrated above. The instructions 324 can also reside, completely or at least partially, within the main memory 304, the static memory 306, and/or within the processor 302 during execution thereof by the computer system 300. The main memory 304 and the processor 302 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 324 or that receives and executes instructions 324 from a propagated signal so that a device connected to a network environment 326 can send or receive voice and/or video data, and that can communicate over the network 326 using the instructions 324. The instructions 324 can further be transmitted or received over a network 326 via the network, interface device 320.

While the computer-readable storage medium 322 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of phone messaging, the method comprising:
   receiving a data packet, the data packet including a non-voice message for a recipient;
   analyzing the data packet to identify the mobile device associated with the recipient, a message type of the non-voice message, a current location of the mobile device, and a wireless network currently serving the mobile device;
   determining whether the mobile device is accessible for messaging;
   determining whether the wireless network supports the message type;
   if it is determined that the mobile device is accessible for messaging and the wireless network supports the message type, delivering the non-voice message over a data channel of the wireless network; and
   if it is determined that the mobile device is not accessible for messaging or the wireless network does not support the message type, performing the following steps:
      encoding the data packet into an audio stream, the encoding comprising converting said data packet into a stream of characters corresponding to characters in a character set; and generating said audio stream using a plurality of different sounds associated with each of said characters in said character set;
      responsive to the encoding, placing a call to said mobile device using a voice channel of said wireless network; and
      responsive to the placing of the call, storing said audio stream for later access by the recipient as a voice message in a voice mail system associated with the mobile device if the mobile device is unavailable for a voice call, else transmitting said audio stream over said voice channel to said mobile device,
      wherein the audio stream is encoded such that the mobile device can reconstruct said data packet from said audio stream to retrieve the non-voice message, and wherein the placing comprises configuring the call to signal to the mobile device that the audio stream comprises the non-voice message.

2. The method of claim 1, wherein each of said different sounds comprises a distinct DTMF tone.

3. The method of claim 1, wherein each one said different sounds comprises an utterance of said one associated one of said characters.

4. The method of claim 3, wherein said reconstructing step further comprises speech recognition of each of said utterances.

5. The method of claim 1, further comprising the step of:
   prior to said transmitting step, negotiating transmission parameters for transmitting said audio stream.

6. A system for phone messaging, the system comprising:
   at least one memory; and
   at least one processor configured to:
      receive a data packet, the data packet including a non-voice message for a recipient;
      analyze the data packet to identify the mobile device associated with the recipient, a message type of the non-voice message, a current location of the mobile device, and a wireless network currently serving the mobile device;
      determine whether the mobile device is accessible for messaging;
      determine whether the wireless network supports the message type;
      if it is determined that the mobile device is accessible for messaging and the wireless network supports the message type, deliver the non-voice message over a data channel of the wireless network; and
      if it is determined that the mobile device is not accessible for messaging or the wireless network does not support the message type, perform the following steps:
         encoding the data packet into an audio stream, the encoding comprising converting said data packet into a stream of characters corresponding to characters in a character set; and generating said audio stream using a plurality of different sounds associated with each of said characters in said character set;
         responsive to the encoding, placing a call to said mobile device using a voice channel of said wireless network; and
         responsive to the placing of the call, storing said audio stream for later access by the recipient as a voice message in a voice mail system associated with the mobile device if the mobile device is unavailable for a voice call, else transmitting said audio stream over said voice channel to said mobile device,
         wherein the audio stream is encoded such that the mobile device can reconstruct said data packet from said audio stream to retrieve the non-voice message, and wherein the placing comprises configuring the call to signal to the mobile device that the audio stream comprises the non-voice message.

7. The system of claim 6, wherein each of said different sounds comprises a distinct multi-frequency tone.

8. The system of claim 6, wherein each one said different sounds comprises an utterance of said one associated one of said characters.

9. The system of claim 6, wherein prior to transmitting said audio stream over said voice channel to said mobile device, the system negotiates transmission parameters for transmitting said audio stream.

10. A non-transitory computer-readable storage medium having stored thereon, a computer program having a plurality of code sections, said code sections executable by a computer for causing the computer to perform the steps of:
    receiving a data packet, the data packet including a non-voice message for a recipient;
    analyzing the data packet to identify the mobile device associated with the recipient, a message type of the non-voice message, a current location of the mobile device, and a wireless network currently serving the mobile device;
    determining whether the mobile device is accessible for messaging;
    determining whether the wireless network supports the message type;
    if it is determined that the mobile device is accessible for messaging and the wireless network supports the message type, delivering the non-voice message over a data channel of the wireless network; and
    if it is determined that the mobile device is not accessible for messaging and/or the wireless network does not support the message type, performing the following steps:
       encoding the data packet into an audio stream, the encoding comprising converting said data packet into a stream of characters corresponding to characters in a character set; and generating said audio stream using a plurality of different sounds associated with each of said characters in said character set;

responsive to the encoding, placing a call to said mobile device using a voice channel of said wireless network; and responsive to the placing of the call, storing said audio stream for later access by the recipient as a voice message in a voice mail system associated with the mobile device if the mobile device is unavailable for a voice call, else transmitting said audio stream over said voice channel to said mobile device, wherein the audio stream is encoded such that the mobile device can reconstruct said data packet from said audio stream to retrieve the non-voice message, and wherein the placing comprises configuring the call to signal to the mobile device that the audio stream comprises the non-voice message.

11. The non-transitory computer-readable storage medium of claim 10, wherein each of said different sounds comprises a distinct multi-frequency tone.

12. The non-transitory computer-readable storage medium of claim 10, wherein each one said different sounds comprises an utterance of said one associated one of said characters.

13. The non-transitory computer-readable storage medium of claim 12, wherein said reconstructing step further comprises codes sections for speech recognition of each of said utterances.

14. The non-transitory computer-readable storage medium of claim 10, further comprising code sections for:

prior to said transmitting step, negotiating transmission parameters for transmitting said audio stream.

* * * * *